(12) United States Patent
Claudio

(10) Patent No.: US 7,315,362 B2
(45) Date of Patent: Jan. 1, 2008

(54) SYSTEM AND METHOD FOR INSPECTING A MOWER

(75) Inventor: Luis R Claudio, Dallas, TX (US)

(73) Assignee: Sears Brands, LLC., Hoffman Estates, IL (US)

( * ) Notice: Subject to any disclaimer, the term of this patent is extended or adjusted under 35 U.S.C. 154(b) by 398 days.

(21) Appl. No.: 11/132,004

(22) Filed: May 18, 2005

(65) Prior Publication Data

US 2006/0277583 A1 Dec. 7, 2006

(51) Int. Cl.
*G01N 21/00* (2006.01)

(52) U.S. Cl. .................................................. 356/237.1

(58) Field of Classification Search .. 356/237.1–237.5, 356/625–636, 638, 152, 267
See application file for complete search history.

(56) References Cited

U.S. PATENT DOCUMENTS 4,576,482 A * 3/1986 Pryor .......................... 356/612
6,161,436 A * 12/2000 McLean, Jr. ................... 73/632
6,549,022 B1 * 4/2003 Cole et al. .................... 324/752
6,688,095 B2   2/2004 Wadzinski
7,210,321 B2 * 5/2007 George ....................... 72/31.03

FOREIGN PATENT DOCUMENTS

JP          1110836    *  4/1989
JP        405256632    * 10/1993

* cited by examiner

*Primary Examiner*—Hoa Q. Pham
(74) *Attorney, Agent, or Firm*—Greenberg Traurig LLP

(57) ABSTRACT

A system and method for inspecting mowers that utilizes a video camera to allow a single technician to look directly at a selected reference point on a crankshaft of the operating mower to thereby determine if the crankshaft is bent.

18 Claims, 3 Drawing Sheets

SYSTEM AND METHOD FOR INSPECTING A MOWER

BACKGROUND

The following relates generally to a system and method for inspecting mowers and, more particularly, relates to a system and method for allowing a user to visually determine if a mower has a bent engine crankshaft.

Mowers, such as the type described and illustrated in U.S. Pat. No. 6,688,095 which is incorporated herein by reference in its entirety, are well known. By way of example and with reference to prior art FIG. 1, known mowers 100 generally include a mower deck 107 defining a first or upper surface 110 to which an engine 106 is attached. The engine 106 is preferably oriented such that the engine crankshaft 104 extends vertically downward into a cutting chamber 109 defined at least in part by the deck 107. A cutting blade 102 is then attached to a lower end 105 of the crankshaft 104 by way of a blade coupler assembly 200. During operation, the crankshaft 104 rotates the blade coupler 200 at a speed sufficient to cause the cutting blade 102 to sever grass that passes beneath the cutting blade 102. In the case where the mower is a self-propelled, walk-behind mower, rotation of the crankshaft 104 may also be used to drive front and/or rear wheels 108 by means of a drive pulley 202, a drive belt 110, and a transmission 111.

When the cutting blade 102 of a mower strikes a stationary object during operation, the impact between the cutting blade 102 and the stationary object may stop the cutting blade 102 at the point of impact, at least for an instant. During this moment of impact the retreating portion of the cutting blade 102 will, however, tend to keep moving forward owing to the kinetic energy stored in the cutting blade 102. Undesirably, the forces associated with the stopping of one portion of the cutting blade 102 and the continued moving of the opposite portion of the cutting blade 102 can cause the crankshaft 104 to bend. Once the crankshaft 104 is bent, continued operation of the mower will typically lead to various of the mower components being further damaged as a result of shear stress forces, vibration, etc.

Presently, to inspect a mower for purposes of determining if the crankshaft is bent, the mower is required to be tilted so that the cutting blade and crankshaft, which are located under the mower deck, become visible. Since a technician that is responsible for tilting the mower typically cannot also see the cutting blade and crankshaft adequately enough to determine if the crankshaft is bent, this process requires the use of a second technician that has the responsibility of observing the cutting blade and crankshaft while the first technician tilts and operates the mower. Thus, it will be appreciated that this currently utilized method for inspecting mowers can be dangerous, e.g., the mower can fall over creating a hazard to nearby associates, can potentially damage the mower, e.g., the mower can be tilted to the wrong side, and is costly and time consuming since it requires the services of at least two technicians.

SUMMARY

To address these and other problems associated with presently utilized methods for inspecting mowers, the present invention provides a system and method for inspecting mowers that is non-destructive and non-intrusive. More particularly, the present invention utilizes a video camera over which the mower is positioned. The video camera allows a single technician to look directly at a selected reference point on the crankshaft by means of a video monitor to thereby monitor movement of the crankshaft as the mower is operated. Thus, using the inventive system, the single technician can verify if the crankshaft is bent by monitoring the operating crankshaft and looking for excursions from the centerline as the crankshaft rotates.

A better understanding of the objects, advantages, features, properties and relationships of the subject invention will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the invention described hereinafter, reference may be had to preferred embodiments shown in the following drawings in which.

DETAILED DESCRIPTION

Figure 1:
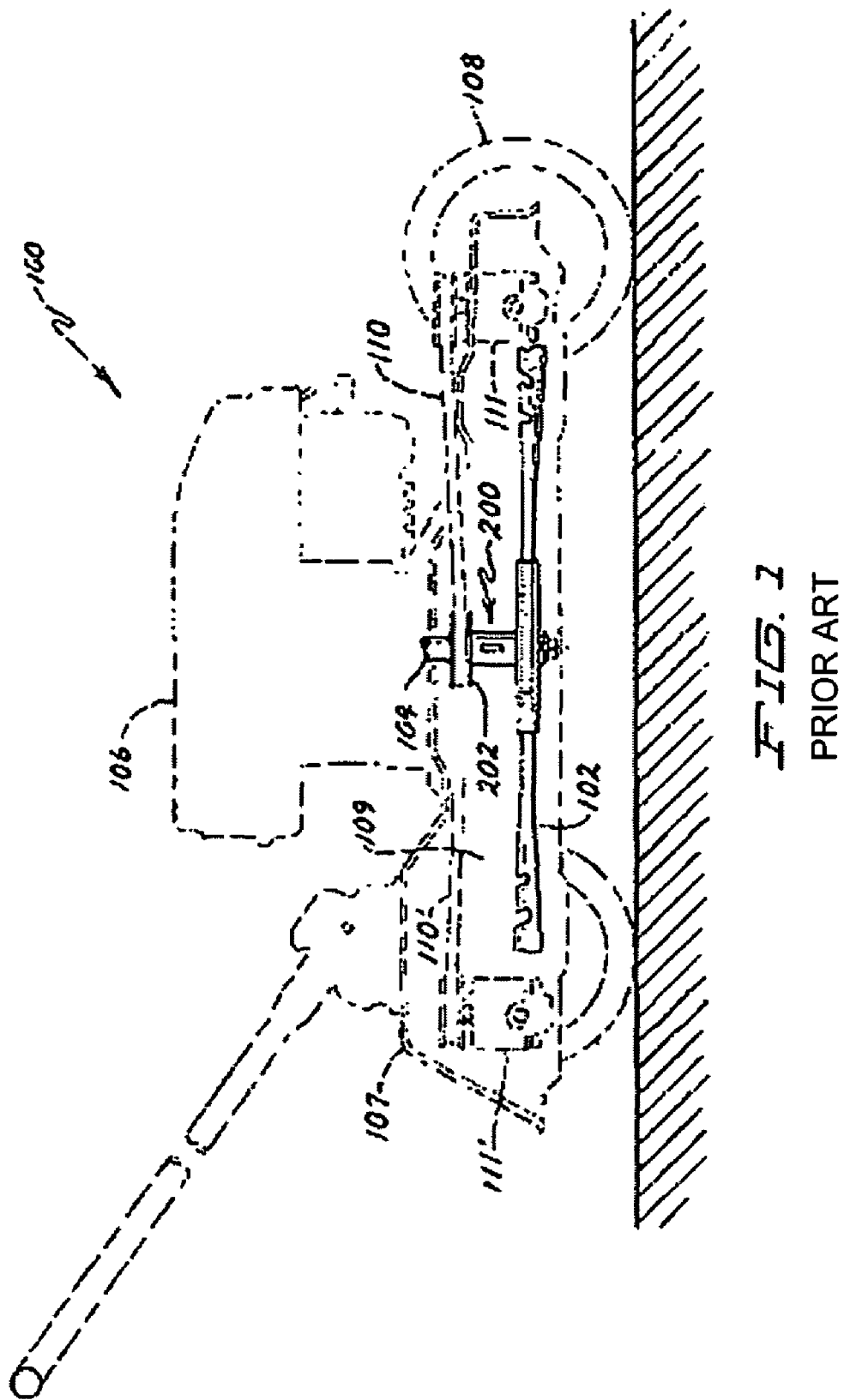
FIG. 1 illustrates a prior art mower by way of example only.
Figure 2:
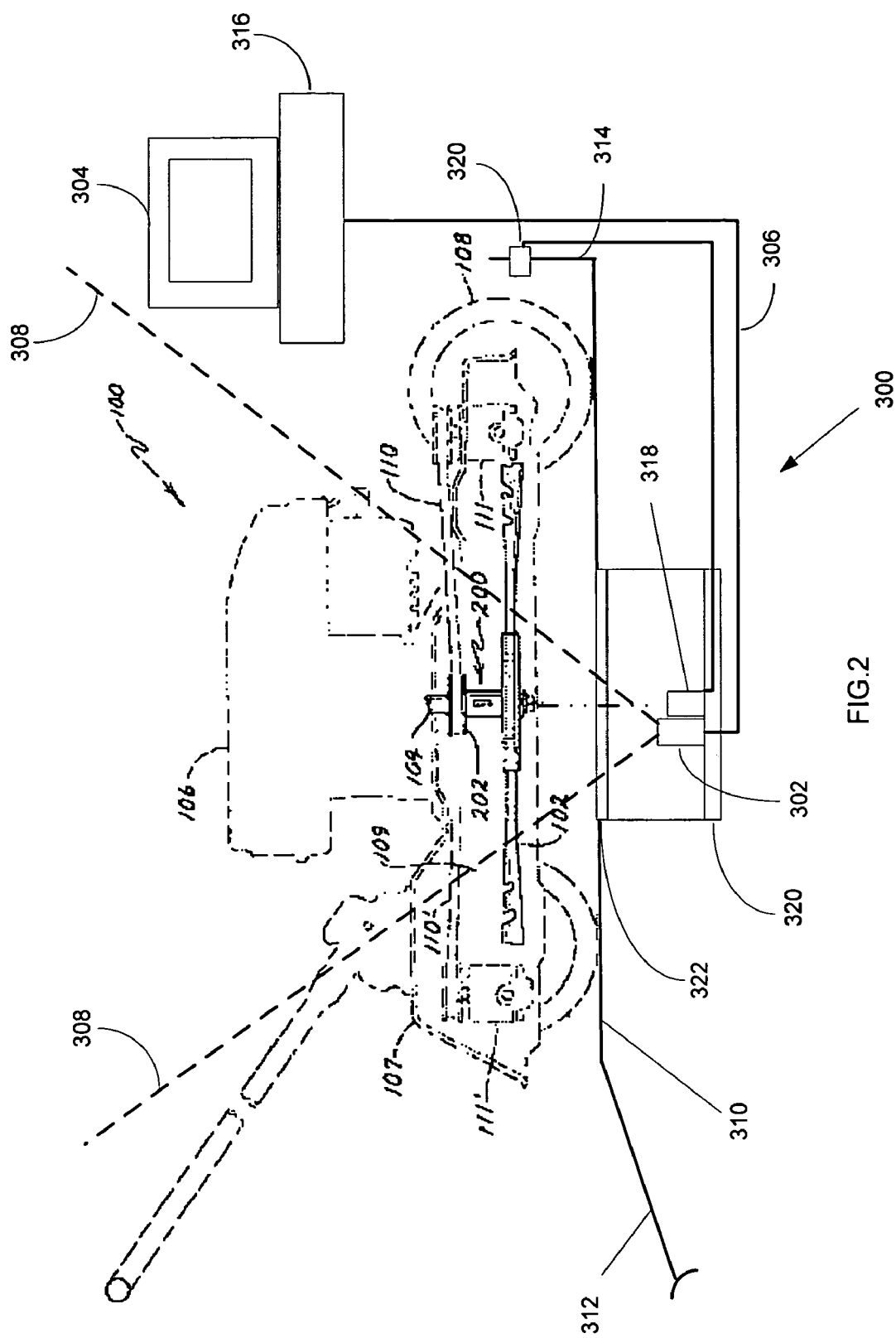
FIG. 2 illustrates an exemplary mower inspection system constructed in accordance with the principles of the subject invention.

With reference to the figures, in which like numerals refer to like elements, FIG. 2 illustrates an exemplary inspection station 300 that allows a user to visually determine if a mower 100 has a bent engine crankshaft 104. To this end, the inspection station 300 includes a video camera 302 which is adapted to provide a video signal to a monitor 304 by means of, for example, a video cable 306. To allow a mower 100 to be positioned above the video camera 302 such that the crankshaft 104 of the mower 100 is within the field of view 308 of the video camera 302, the inspection station 300 may include an elevated platform 310 that is adapted to support the mower 100. Preferably, the elevated platform 310 includes a ramp surface 312 that allows the mower 100 to be easily moved onto the elevated platform 310 and into the general area of the field of view 308 of the video camera 302. The elevated platform 310 may additionally be provided with a means for maintaining the mower 100 in a stationary position once the mower 100 is positioned upon the elevated platform 310 in a desired location with respect to the video camera 302. The means for maintaining the mower 100 in a stationary position may include, by way of example only, a device that functions to clamp the front wheels 108 of the mower 100 to the surface of the elevated platform 310, a device that functions to clamp the front wheels 108 to a front stop 312 of the elevated platform 310, or the like.

Figure 4:
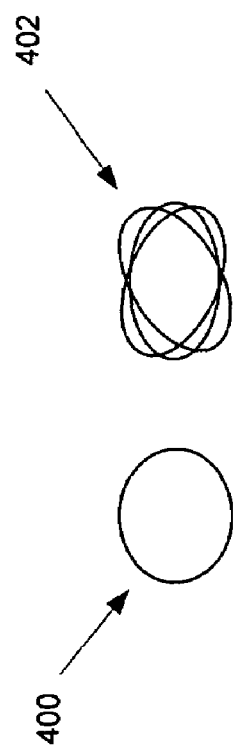
FIG. 4 illustrates a comparison between the view of an unbent crankshaft and the view of a crankshaft that is bent during operation of a mower.

Once the mower 100 is moved upon the platform 310 and into the field of view 308 of the video camera 302 (and preferably anchored to the platform 310), the mower 100 may be started to thereby allow the technician to inspect the condition of the crankshaft 104. More particular, the technician may inspect the condition of the crankshaft 104 by viewing the video image captured by the video camera 302 on the monitor 304. If the crankshaft 104 is normal, i.e., unbent, the technician will view a video image of the rotating crankshaft 104 similar to image 400 of FIG. 4, i.e., the image will have a steady, generally circular appearance. If, however, the crankshaft 104 is bent, the technician will view a video image of the rotating crankshaft 104 that shows a wobbling image, such as illustrated in image 402 of FIG. 4.

To maintain a copy of the video image viewed during the inspection process, for example to allow a customer to view the same video image that was viewed by the technician during the inspection process, the inspection station 300 may also include a video capture device 316 that is also linked to the video camera 302. The video capture device 316 may be a video cassette recorder or the like. It is also contemplated that video images captured using the video capture device 316 may be stored on a server accessible database to thereby allow for viewing of the captured video images via a network, such as the Internet. In this manner, a customer may access the server via the network, provide some indicia that serves to identify the customer (e.g., phone number, name, log-in/password, etc.), and be provided with an opportunity to view and/or download the video capture of the inspection of their mower.

Figure 3:
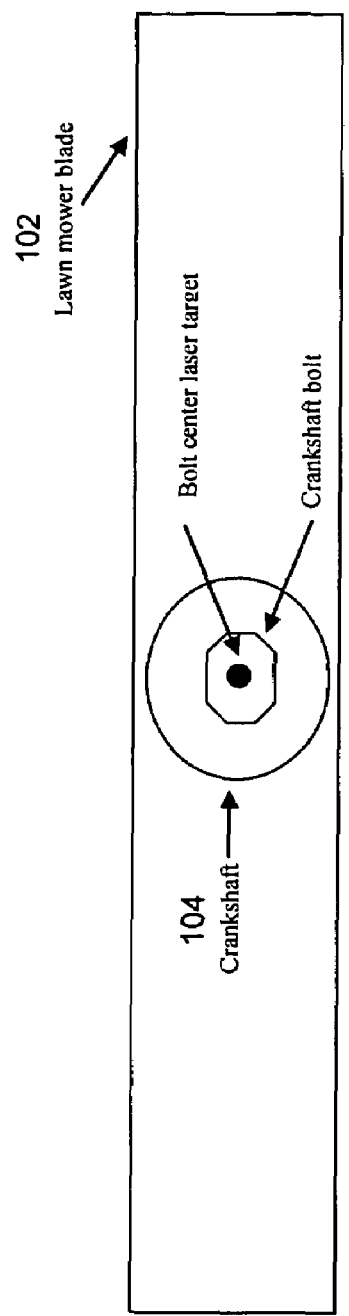
FIG. 3 illustrates a view of the mower blade as seen by the camera of the system of FIG. 2.

In a further embodiment of the invention, the inspection system 300 may also be provided with a laser emitting device 318 that may be used to provide a point of light to the rotating crankshaft 104 as illustrated in FIG. 3. As will be understood, the point of light can be used to assist the technician in locating and viewing the centerline of the engine crankshaft 104. Being able to view a visibly demarked centerline of the engine crankshaft 104 during the inspection process will assist the technician in verifying whether or not the rotating crankshaft 104 has any excursions from that centerline which, as discussed above, are indicative of a bent crankshaft. While not required, the laser emitting device 318 may have an associated proximity switch 320 which functions to inhibit the laser emitting device 318 from emitting light when the mower 100 is not positioned on the elevated platform 310 over the video camera 302 and light emitting device 318. In this manner, the proximity switch 320 can be used to prevent the emitting of light into the area above the elevated platform 310 when that area is not shielded by the mower platform 107. It will be appreciated that, while the illustrated example shows the light from the laser emitting device 318 being provided directly to the crankshaft 104, the light from the laser emitting device 318 may also be directed to the crankshaft 104 by means of a mirror.

To allow the camera 302 and/or laser emitting device 318 to be easily moved relative to the mower 100 to thereby allow for the field of view 308 of the video camera 302 to be adjusted and/or the laser emitting device 318 to be moved for the purpose of placing the light emitted from the laser emitting device 318 on the centerline of the crankshaft, the camera 302 and/or the laser emitting device 318 may be carried upon a sub-platform 320 that is itself moveable relative to the elevated platform 310. In this regard, the sub-platform 320 may be moveable in one, two, or three dimensions for this purpose. In the situation where a mirror is utilized to direct light from a laser emitting device 318 onto the crankshaft 104, the mirror may be adjustable to allow for the light emitted from the laser light device 318 to be directed to the centerline of the crankshaft 104. It will be appreciated that the placing the sub-platform 320 in the desired position may itself be facilitated by the technician viewing video images captured by the video camera 302 on the monitor 304.

To provide a measure of protection to the components of the inspection system 300 during the inspection process, in particular the video camera 302 and laser emitting device 318, a plexiglass or similar transparent/translucent shielding 322 may be provided to the elevated platform 310 in an area under which would be positioned the video camera 302 and laser emitting device 318. As will be appreciated, as the mower 100 is operated during the inspection process particulates, etc. may be caused to be dropped or propelled from the mower 100. Thus, the shielding 322 will function to protect the noted components from such flying debris.

From the foregoing description it will be appreciated that the subject invention provides a system and method for inspecting a mower which overcomes the problems previously discussed. It will be also appreciated by those skilled in the art that, while specific embodiments of the invention have been described in detail, various modifications and alternatives to those details could be developed in light of the overall teachings of this disclosure. For example, the inspection of the rotating crank shaft 104 may also include the use of a light that is strobed onto the rotating crankshaft 104 to thereby further assist the technician in viewing the crankshaft 104 as it rotates. In addition, the video capture system may provide for the capturing of single frame images that may be overlayed or otherwise compared to one another to thereby allow any wobble of the rotating crankshaft to be easily seen. Accordingly, the particular arrangements disclosed are meant to be illustrative only and not limiting as to the scope of the invention which is to be given the full breadth of the appended claims and any equivalents thereof.

What is claimed is:

1. A station for use in inspecting a crankshaft of a mower, comprising:
    a platform for supporting the mower;
    a video camera disposed under the platform having a field of view selected such that placement of the mower upon the platform allows the video camera to capture video images of an end of the crankshaft as the crankshaft is rotated during operation of the mower; and
    a monitor for use in viewing video images captured by the video camera during operation of the mower whereby a technician determines if the crankshaft is bent by looking for wobbling of the end of the crankshaft about a centerline of the crankshaft as the crankshaft is rotated during operation of the mower.

2. The station as recited in claim 1, further comprising a laser emitting device for use in visibly demarking the centerline of the crankshaft on the end of the crankshaft.

3. The station as recited in claim 2, wherein light from the laser is directed directly upon the end of the crankshaft.

4. The station as recited in claim 2, wherein the light from the laser is reflected onto the end of the crankshaft.

5. The station as recited in claim 2, wherein the laser emitting device has an associated switch such that the laser emitting device is inhibited from emitting light when the mower fails to be positioned in at least a desired location upon the platform.

6. The system as recited in claim 2, wherein the laser emitting device is mounted on a sub-platform that is moveable relative to the platform.

7. The station as recited in claim 1, wherein the platform includes a shielding disposed between the video camera and the mower, the shielding have a translucency which allows the video camera to capture video images of the mower during the inspection process.

8. The system as recited in claim 7, wherein the shielding comprises a layer of plexiglass.

9. The system as recited in claim 1, further comprising a video image storage device for storing the video image captured by the video camera.

10. The system as recited in claim 9, wherein the video image storage device is accessible via a network.

11. The system as recited in claim 10, wherein the network comprises the Internet.

12. The system as recited in claim 1, wherein the video camera is mounted on a sub-platform that is moveable relative to the platform.

13. A method for inspecting a crankshaft of a mower, comprising:
   positioning the mower over a video camera in a field of view of the video camera;
   starting the mower to cause rotation of the crankshaft;
   using the video camera to capture images of an end of the crankshaft as the crankshaft rotates; and
   viewing the video images captured by the video camera on a video monitor associated with the video camera to look for wobbling of the end of the crankshaft about a centerline of the crankshaft as the crankshaft is rotated during operation of the mower to thereby determine if the crankshaft of the mower is bent.

14. The method as recited in claim 13, comprising using a light emitting device to visible demark the centerline of the crankshaft on the end of the crankshaft.

15. The method as recited in claim 13, comprising storing the video images captured by the video camera.

16. The method as recited in claim 15, comprising making the stored video images available via a network server.

17. The method as recited in claim 13, comprising strobing a light on the end of the crankshaft during rotation of the crankshaft.

18. The method as recited in claim 13, wherein viewing the video images captured by the video camera comprises overlaying at least two distinct images captured by the video camera.

* * * * *